(12) United States Patent
Reddy et al.

(10) Patent No.: US 7,983,359 B2
(45) Date of Patent: Jul. 19, 2011

(54) SYNCHRONIZATION TECHNIQUES FOR POLAR TRANSMITTERS

(75) Inventors: Ajit K. Reddy, Matawan, NJ (US); Walid K. M. Ahmed, Tinton Falls, NJ (US)

(73) Assignee: Pine Valley Investments, Inc., Las Vegas, NV (US)

( * ) Notice: Subject to any disclaimer, the term of this patent is extended or adjusted under 35 U.S.C. 154(b) by 770 days.

(21) Appl. No.: 12/028,004

(22) Filed: Feb. 7, 2008

(65) Prior Publication Data
US 2009/0202018 A1 Aug. 13, 2009

(51) Int. Cl.
*H04L 27/36* (2006.01)
(52) U.S. Cl. ......... 375/298; 375/261; 375/316; 370/206
(58) Field of Classification Search .................. 375/298, 375/261, 316; 370/206
See application file for complete search history.

(56) References Cited

U.S. PATENT DOCUMENTS

| | | | |
|---|---|---|---|
| 5,745,527 A | 4/1998 | Kelton et al. | |
| 6,043,707 A * | 3/2000 | Budnik | 330/10 |
| 6,141,390 A * | 10/2000 | Cova | 375/297 |
| 6,304,140 B1 | 10/2001 | Thron et al. | |
| 6,445,249 B1 * | 9/2002 | Khan et al. | 330/149 |
| 6,600,369 B2 | 7/2003 | Mitzlaff | |
| 6,650,691 B2 | 11/2003 | Cramer, III | |
| 6,735,419 B2 | 5/2004 | Mitzlaff | |
| 6,834,183 B2 | 12/2004 | Black et al. | |
| 6,850,574 B2 | 2/2005 | Schwent et al. | |
| 6,898,252 B1 * | 5/2005 | Yellin et al. | 375/296 |
| 6,937,874 B2 | 8/2005 | Cramer, III | |
| 7,012,970 B2 | 3/2006 | Greenwood et al. | |
| 7,020,215 B2 | 3/2006 | Porco et al. | |
| 7,085,330 B1 | 8/2006 | Shirali | |
| 7,449,960 B2 | 11/2008 | Bunch et al. | |
| 7,715,810 B2 * | 5/2010 | Brobston | 455/114.2 |
| 7,742,748 B2 | 6/2010 | Matero et al. | |
| 2002/0196864 A1 * | 12/2002 | Booth et al. | 375/296 |
| 2003/0095608 A1 | 5/2003 | Duperray | |
| 2003/0102912 A1 * | 6/2003 | Tripathi et al. | 330/136 |
| 2003/0215025 A1 | 11/2003 | Hietala | |
| 2003/0215026 A1 | 11/2003 | Hietala | |
| 2004/0047432 A1 | 3/2004 | Iwasaki | |
| 2004/0219891 A1 * | 11/2004 | Hadjichristos | 455/102 |
| 2005/0085198 A1 | 4/2005 | Anvari | |
| 2005/0122166 A1 | 6/2005 | Premakanthan et al. | |
| 2005/0130609 A1 | 6/2005 | Nagode et al. | |
| 2005/0245208 A1 * | 11/2005 | Udagawa et al. | 455/102 |
| 2006/0067424 A1 * | 3/2006 | Wolf | 375/296 |
| 2006/0071711 A1 * | 4/2006 | Persson et al. | 330/149 |
| 2006/0128324 A1 | 6/2006 | Tan et al. | |
| 2006/0178120 A1 * | 8/2006 | Puma | 455/114.3 |
| 2007/0189417 A1 * | 8/2007 | Waheed et al. | 375/300 |
| 2007/0190952 A1 * | 8/2007 | Waheed et al. | 455/114.3 |
| 2007/0211821 A1 | 9/2007 | Haque et al. | |

(Continued)

*Primary Examiner* — Juan A Torres
(74) *Attorney, Agent, or Firm* — Fox Rothschild, LLP; Robert J. Sacco (57) ABSTRACT

Various techniques involving polar modulation are disclosed. For instance, an apparatus may include a storage medium and a calibration module. The storage medium stores multiple adjustment settings. Each of these adjustment settings corresponds to an operating condition. The calibration module selects one of the stored adjustment settings that corresponds to a current operating condition. With the selected adjustment setting, the calibration module reduces a polar modulation timing misalignment. The current operating condition may include one or more operational parameter values. Examples of such parameter values include output power level, signal frequency, and/or temperature.

17 Claims, 10 Drawing Sheets

U.S. PATENT DOCUMENTS

| | | |
|---|---|---|
| 2007/0223621 A1 | 9/2007 | Ahmed |
| 2007/0230612 A1 | 10/2007 | Ahmed |
| 2007/0275674 A1* | 11/2007 | Chien .................... 455/90.2 |
| 2008/0051042 A1 | 2/2008 | Komaili et al. |
| 2008/0074209 A1 | 3/2008 | Ceylan et al. |
| 2008/0225981 A1 | 9/2008 | Reddy et al. |
| 2008/0225984 A1 | 9/2008 | Ahmed et al. |
| 2009/0052575 A1 | 2/2009 | Waheed et al. |
| 2009/0054000 A1* | 2/2009 | Waheed et al. ............ 455/63.1 |
| 2009/0054018 A1 | 2/2009 | Waheed et al. |
| 2009/0122911 A1* | 5/2009 | Carey ....................... 375/296 |
| 2009/0251195 A1 | 10/2009 | Ahmed et al. |
| 2009/0280758 A1 | 11/2009 | Pratt et al. |
| 2010/0009642 A1 | 1/2010 | Pratt et al. |
| 2010/0027711 A1 | 2/2010 | Manku et al. |

* cited by examiner

SYNCHRONIZATION TECHNIQUES FOR POLAR TRANSMITTERS

BACKGROUND

Polar modulation is a technique in which a signal, or carrier, having a constant radian frequency ω, is time-varied in both magnitude and phase. Typically, polar transmitters receive baseband signals represented in Cartesian form as in-phase (I) and quadrature (Q) component signals, which are naturally symmetric. The I and Q baseband component signals are then converted into a polar form that is represented in terms of corresponding R and θ component signals. This conversion may be performed by a coordinate rotation digital computer (CORDIC) algorithm.

The R and θ signals are processed in separate amplitude and phase paths and may be recombined at the output of the power amplifier. Timing misalignments between the amplitude and phase signals may occur. Such timing misalignments are detrimental to signal quality. For instance, timing misalignments may impair the downstream reconstruction of the corresponding I and Q component signals.

The delays associated with R and θ paths are not necessarily static. For instance, such delays may vary with transmit power level. Therefore, dynamic alignment of R and θ paths during operation may be desirable.

SUMMARY

The present invention provides various embodiments that may involve polar modulation. For instance, an apparatus may include a storage medium and a calibration module. The storage medium stores multiple adjustment settings. Each of these adjustment settings corresponds to an operating condition (e.g., an output power level). The calibration module selects one of the stored adjustment settings that corresponds to a current operating condition (e.g., a current output power level). With the selected adjustment setting, the calibration module reduces a polar modulation timing misalignment.

A further apparatus may include a phase path, an amplitude path, an amplifier, and a calibration module. The phase path provides a phase signal and the amplitude path provides an amplitude signal. From these signals, the amplifier produces a polar modulated signal. The calibration module reduces a timing misalignment between the phase path and the amplitude path with an adjustment setting that is based on a current operating condition, such as a current output power level.

Further, a method may store multiple adjustment settings that each correspond to an operating condition. The method selects one of the stored adjustment settings based on a current operating condition, and reduces a polar modulation timing misalignment with the selected adjustment setting.

DETAILED DESCRIPTION

Various embodiments may be generally directed to techniques for reducing polar modulation timing misalignments. Such techniques may involve performing alignment calibration based on a current operating condition. For instance, operating conditions may have corresponding alignment adjustment setting. Each adjustment setting may include one or more parameters to adjust the alignment of the amplitude and phase paths. Such parameter(s) may include an amplitude path delay adjustment and/or a phase path delay adjustment. By applying these adjustment settings, path synchronization may be maintained for various operating conditions, such as across a range of output power levels, and/or other operational parameters.

Figure 1:
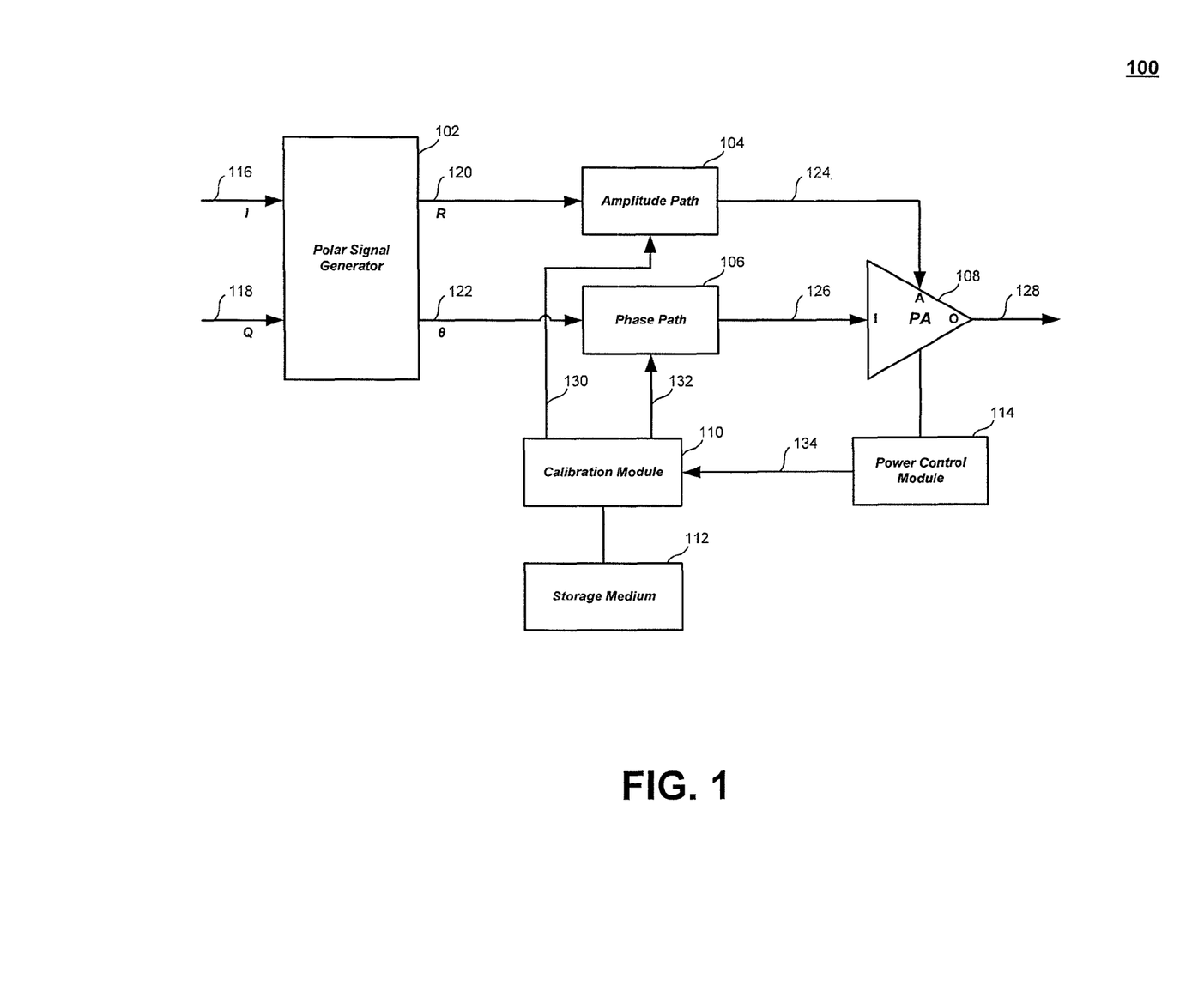
FIG. 1 illustrates an exemplary apparatus embodiment.

FIG. 1 illustrates an embodiment of an apparatus 100 that may employ polar modulation techniques. Apparatus 100 may be included in various types of devices, such as mobile telephony handsets and cellular base stations. The embodiments, however, are not limited to these examples.

Apparatus 100 may comprise various elements. For instance, FIG. 1 shows that apparatus 100 may include a polar signal generator 102, an amplitude path 104, a phase path 106, a power amplifier (PA) 108, a calibration module 110, a storage medium 112, and a power control module 114. These elements may be implemented in hardware, software, firmware, or any combination thereof.

Polar signal generator 102 generates an amplitude signal (R) 120 and a phase signal (θ) 122. These signals may be generated from an in-phase signal (I) 116 and a quadrature signal (Q) 118. Thus, polar signal generator 102 may include components and/or functionality to perform a CORDIC algorithm. Amplitude signal 120 and phase signal 122 may be digital signals. However, other types of signals (e.g., analog signals) may be employed.

Amplitude path 104 receives amplitude signal 120 and produces a corresponding analog amplitude signal 124. Similarly, phase path 106 receives phase signal 122 and produces a corresponding analog phase signal 126. These paths may each include various components, such as digital to analog converters (DACs), filters, and variable delay elements. Such variable delay elements may be controlled by calibration module 110. Details regarding an exemplary implementation for paths 104 and 106 are provided below with reference to FIG. 2.

PA 108 includes an input node (I), an amplitude modulation node (A), and an output node (O). In addition, PA 108 is coupled to power control module 114. Thus, PA 108 may receive operational power from power control module 114. As shown in FIG. 1, input node (I) receives phase signal 126, and amplitude modulation node (A) receives amplitude signal 124. During operation, phase signal 126 is amplified according to a time varying gain that is established by amplitude signal 124. As a result, signals 124 and 126 are combined into a polar modulated signal 128. PA 108 provides this signal at output node (O). In turn, output node (O) may be coupled to various elements (not shown). Examples of such elements include switches, couplers, antennas, and so forth.

PA 108 may comprise a single amplification stage or multiple amplification stages. Various devices may be used to implement PA 108. For instance, PA 108 may include one or more heterojunction bipolar transistors (HBTs). Additionally or alternatively, PA 108 may include other types of devices. Examples of such other device types include field effect transistors (FETs), bipolar junction transistors (BJT), and so forth.

As described above, power control module 114 is coupled to PA 108. Power control module 114 sets an output power level for PA 108. This may involve adjusting parameter(s) (e.g., gain and/or bias point) of PA 108. Power control module 114 may include a power source to deliver operational power to PA 108. In addition, power control module 114 provides a power level indicator 134 to calibration module 110. Power level indicator 134 identifies the current output power level.

Power control module 114 may adjust the output power level for various reasons. For instance, the power level may be adjusted in response to a power control command received from a remote device (e.g., a base station). Also, the output power level may be adjusted for the commencement or conclusion of a particular transmission. Further, the output power level may be adjusted to accommodate a change in data rate. In wideband code division multiple access (WCDMA) networks, such a data rate change may involve a transport format combination (TFC) change.

For any given output power setting change, corresponding changes in amplifier circuit characteristics may occur. Such changes may include one or more of gain value changes, attenuation value changes, changes in the number of amplification stages employed, and so forth. As a result, changes in amplitude path delay and phase path delay may occur. Moreover, such delay changes may be different for each path. As a result, signals 124 and 126 may become misaligned in time. Such misalignments are referred to herein as polar modulation misalignments.

Calibration module 110 may reduce polar modulation misalignments (e.g., timing misalignments between amplitude path 104 and phase path 106). This may involve adjusting the delays of one or both paths. In either case, such adjustment(s) offset a difference between the delays of amplitude path 104 and phase path 106 such that these paths have equal (or substantially similar) delays. As described above, such timing misalignments may vary with the output power level. Therefore, calibration module 110 may provide delay adjustments that also vary with the output power level.

For example, FIG. 1 shows that calibration module 110 may send an amplitude path delay adjustment parameter 130 to amplitude path 104 and/or a phase path delay adjustment parameter 132 to phase path 106. These adjustment parameter(s) may be received by variable delay elements within amplitude path 104 and/or phase path 106. Upon receipt, these variable delay element(s) may adjust their delays accordingly. As a result, the corresponding path delay(s) are adjusted.

Delay adjustment parameters 130 and/or 132 may be in various forms. For example, when controlling a digital delay line, a delay adjustment parameter may specify a queue length. Alternatively, a delay adjustment parameter may indicate a particular time delay. In turn, such an indication may then be interpreted and applied by the receiving variable delay element. Further, a delay adjustment parameter may specify characteristics for an analog delay circuit (e.g., a tapped delay line). The embodiments are not limited to these examples.

Calibration module 110 may align amplitude path 104 and phase path 106 based on a current output power level. Accordingly, calibration module 110 may employ an adjustment setting that corresponds to the current output power level. This setting may be obtained from storage medium 112. Further, calibration module 110 may select this adjustment setting based on power level indictor 134, which is received from power control module 114.

Storage medium 112 may store multiple adjustment settings, where each adjustment setting corresponds to an output power level. Each setting may include delay adjustment parameters, such as a phase path delay adjustment parameter and/or an amplitude path delay adjustment parameter. This information may be arranged in various ways, such as in a lookup table (LUT) indexed by output power level. The embodiments, however, are not limited to this arrangement.

Storage medium 112 may be implemented in various ways. For instance, storage medium 112 may comprise memory, such as random access memory (RAM), flash memory, and/or read only memory (ROM). The embodiments, however, are not limited to these examples.

In general operation, calibration module 110 is informed of changes in output power level through power level indicator 134. Upon such a notification, calibration module 110 may access a corresponding adjustment setting from storage medium 112. With the accessed adjustment setting, calibration module 110 may adjust the alignment of amplitude path 104 and phase path 106. As described above, this may involve adjusting the delay of one path or the delays of both paths.

Figure 2:
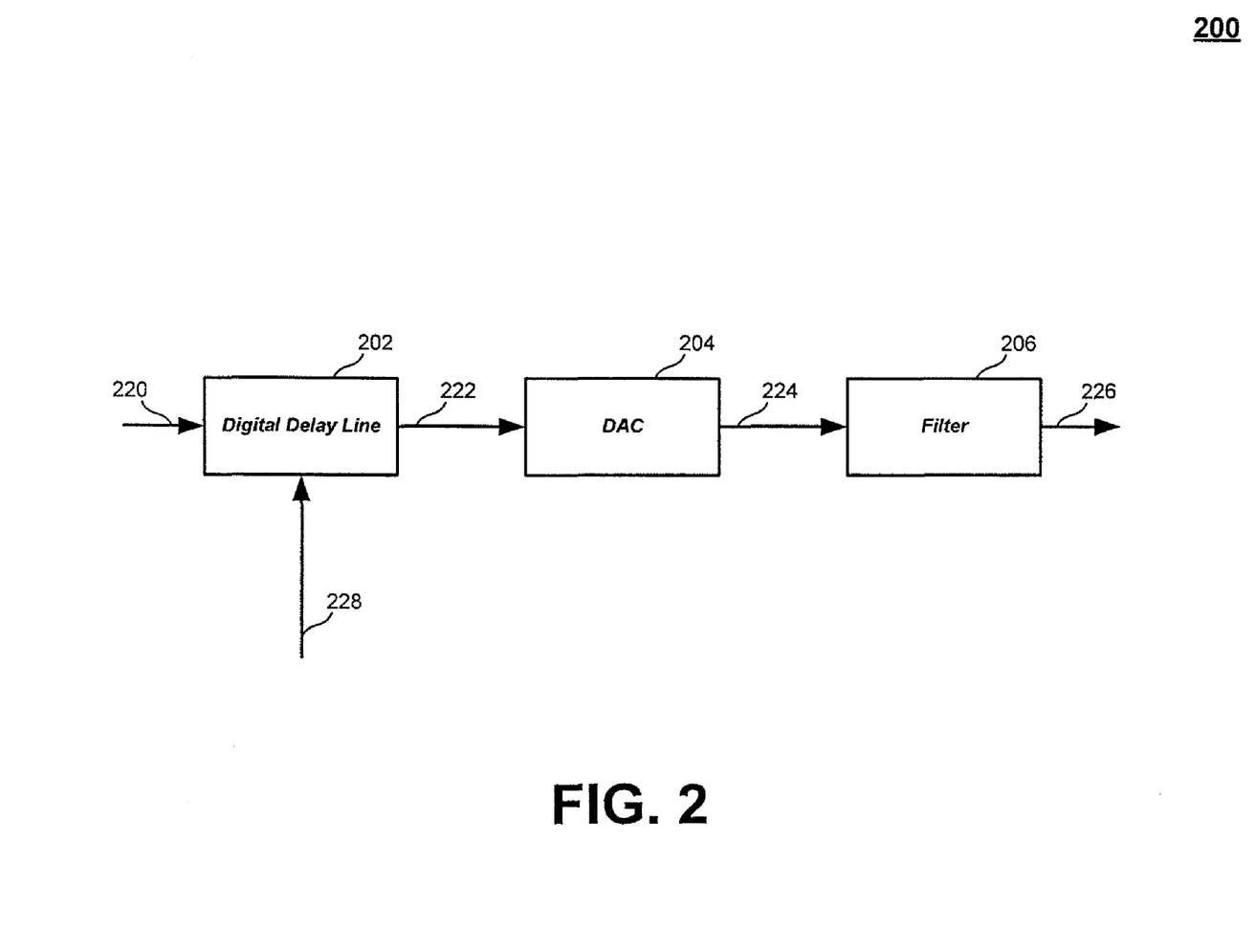
FIG. 2 illustrates an exemplary path implementation.

FIG. 2 is a diagram showing an exemplary path implementation 200, which may be employed by amplitude path 104 and/or phase path 106. The embodiments, however, are not limited to this implementation. Implementation 200 may include various elements, such as a digital delay line 202, a digital to analog converter (DAC) 204, and a filter 206. These elements may be implemented in hardware, software, firmware, or any combination thereof.

Digital delay line 202 may be implemented in various ways. For example, it may comprise a buffer having an adjustable length. As shown in FIG. 2, digital delay line 202 receives an input signal 220 (such as amplitude signal 120 or phase signal 122) and produces a corresponding delayed signal 222. A control parameter 228 determines the extent to which signal 222 is delayed. In the context of FIG. 1, control signal 228 may be implemented as delay adjustment parameter 130 or as delay adjustment parameter 132.

Digital to analog converter (DAC) 204 converts signal 222 into an analog format as signal 224. Signal 224 is sent to filter 206. Filter 206 may be a low pass filter that produces a filtered signal 226 from signal 224. Filtered signal 226 may be sent to an amplifier (e.g., PA 108) for polar modulation. Thus, referring again to FIG. 1, filtered signal 226 may be implemented as amplitude signal 124 or phase signal 126.

Figure 3:
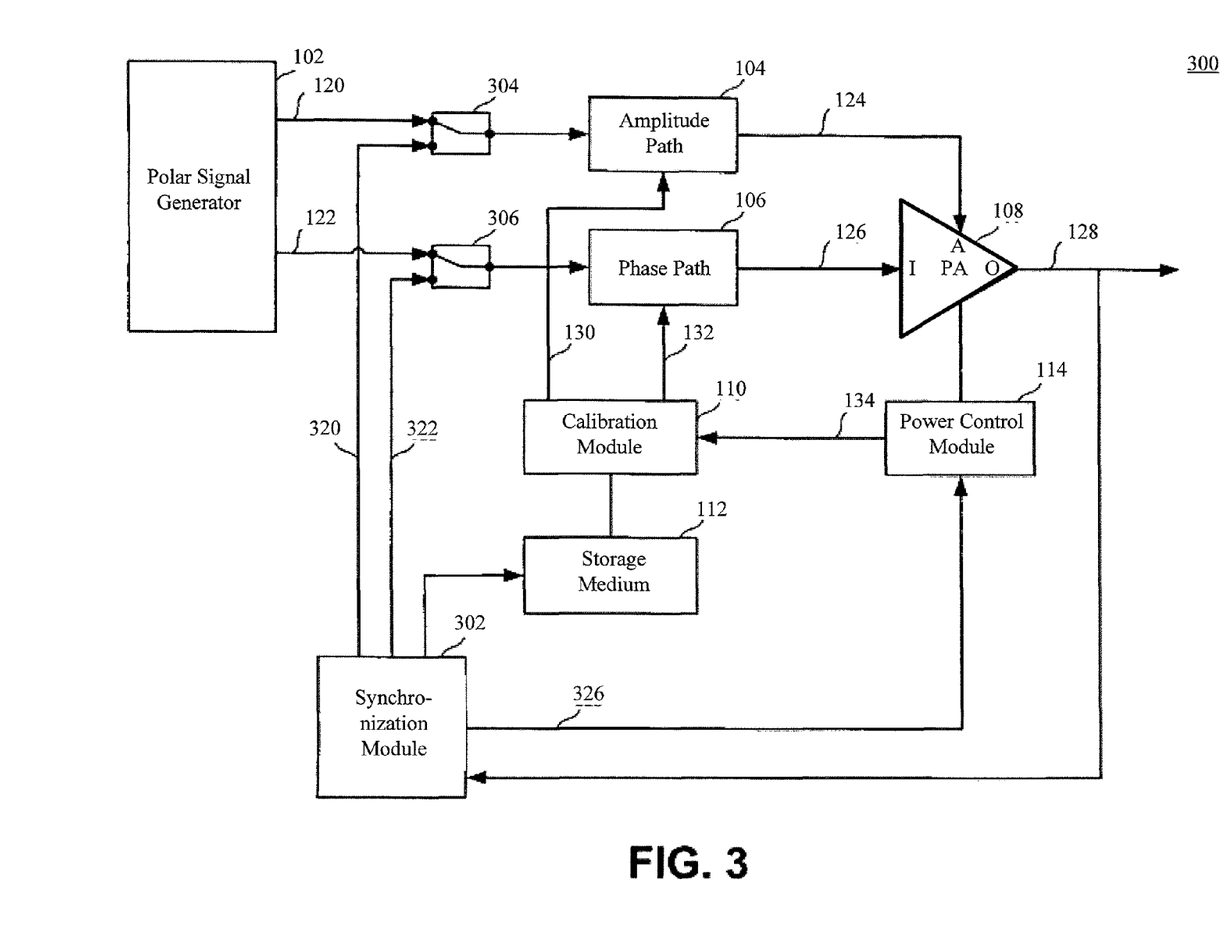
FIGS. 3-5 illustrates further exemplary apparatus embodiments.

FIG. 3 is a diagram showing an apparatus 300, which is similar to apparatus 100 of FIG. 1. However, apparatus 300 further includes a synchronization module 302, as well as switches 304 and 306 These elements may be implemented in hardware, software, firmware, or any combination thereof.

Switches 304 and 306 may selectively connect amplitude path 104 and phase path 106 with calibration module 110. Through these connections, synchronization module 302 may determine path delays and establish corresponding adjustment parameters.

For instance, synchronization module 302 may generate training signals 320 and 322, which are sent to amplitude path 104 and phase path 106. The resultant output signals (128) are sent to synchronization module 302. Based on these output signals, synchronization module 302 may estimate the delays of paths 104 and 106.

Synchronization module 302 is coupled to power control module 114. Accordingly, synchronization module 302 may direct power control module 114 to apply certain power levels to PA 108. For instance, FIG. 3 shows synchronization module 302 sending a power level directive 326 that instructs power control module 114 to apply a particular power level.

Thus, synchronization module 302 may estimate path delays for multiple power levels. From these estimated delays, synchronization module 302 may determine corresponding adjustment settings for each power level. As described above, such adjustment settings may offset differences in amplitude path delays and phase path delays. Each adjustment setting may include an amplitude path delay adjustment parameter and/or phase path delay adjustment parameter. Synchronization module 302 may store the determined adjustment settings and corresponding output power levels in storage medium 112.

Synchronization module 302 may employ various techniques to estimate the delays of amplitude path 104 and phase path 106. Exemplary techniques are disclosed in U.S. patent application Ser. No. 11/396,122, filed on Mar. 30, 2006, and entitled "Apparatus, System, and Method for Amplitude-Phase Synchronization in Polar Transmitter." This application is incorporated herein by reference in its entirety.

According to the techniques disclosed in this application, amplitude modulation path delays and phase modulation path delays may be estimated in separate steps (e.g., a two-step method) or in one step (e.g., a single-step method).

The two-step method estimates amplitude modulation path delay in a first step, and estimates phase modulation path delay in a second step. More particularly, the first step involves passing an amplitude training waveform through the amplitude path and the second step involves passing a frequency training waveform through the phase path. These first and second steps may be performed in any order.

The amplitude training waveform of the two-step method is driven through the amplitude path of the polar transmitter while no signal or waveform is driven through the phase path. The amplitude training waveform is amplified by the PA (e.g., PA 108) and amplitude modulated with a carrier waveform. The envelope of the amplified amplitude modulated training waveform is detected at the output of the PA. The detected envelope is correlated with the input amplitude training waveform to estimate the amplitude modulation path delay.

The frequency training waveform of the two-step method is driven through the phase path of the polar transmitter while no signal or waveform is driven through the amplitude path. The frequency training waveform is frequency modulated at the PA with the carrier waveform. Accordingly, the output of the PA is an FM training waveform. This waveform may detected and correlated with the respective input training waveform to estimate a delay for the respective amplitude or phase path. However, prior to envelope detection, the FM training waveform first may be converted from an FM waveform to an AM waveform by an FM-to-AM converter.

In the single-step method, amplitude and phase modulation path delays may be estimated simultaneously. This may involve simultaneously passing an amplitude training waveform and a phase training waveform through the amplitude and phase paths, respectively. The output of the PA may then be down-converted with a local oscillator (LO) signal. At this point, a CORDIC process may extract amplitude and phase components, which are correlated with the respective input training waveforms to estimate the delays.

The delay estimation techniques described above are provided as examples, and not as limitations. Therefore, embodiments may employ other techniques to determine amplitude path and phase path delays.

As described herein, embodiments may align phase and amplitude paths based on operating conditions. Such operating conditions may include one or more operational parameters. Examples of such parameters include output power level, output signal frequency, operating temperature. The embodiments, however, are not limited to these parameters. Moreover, operating conditions may include any combination of such parameters.

For purposes of illustration, FIGS. 1 and 3 provide examples in which the operating conditions involve output power levels. Thus, in these examples, phase and amplitude paths are aligned based on a current output power level.

Figure 4:
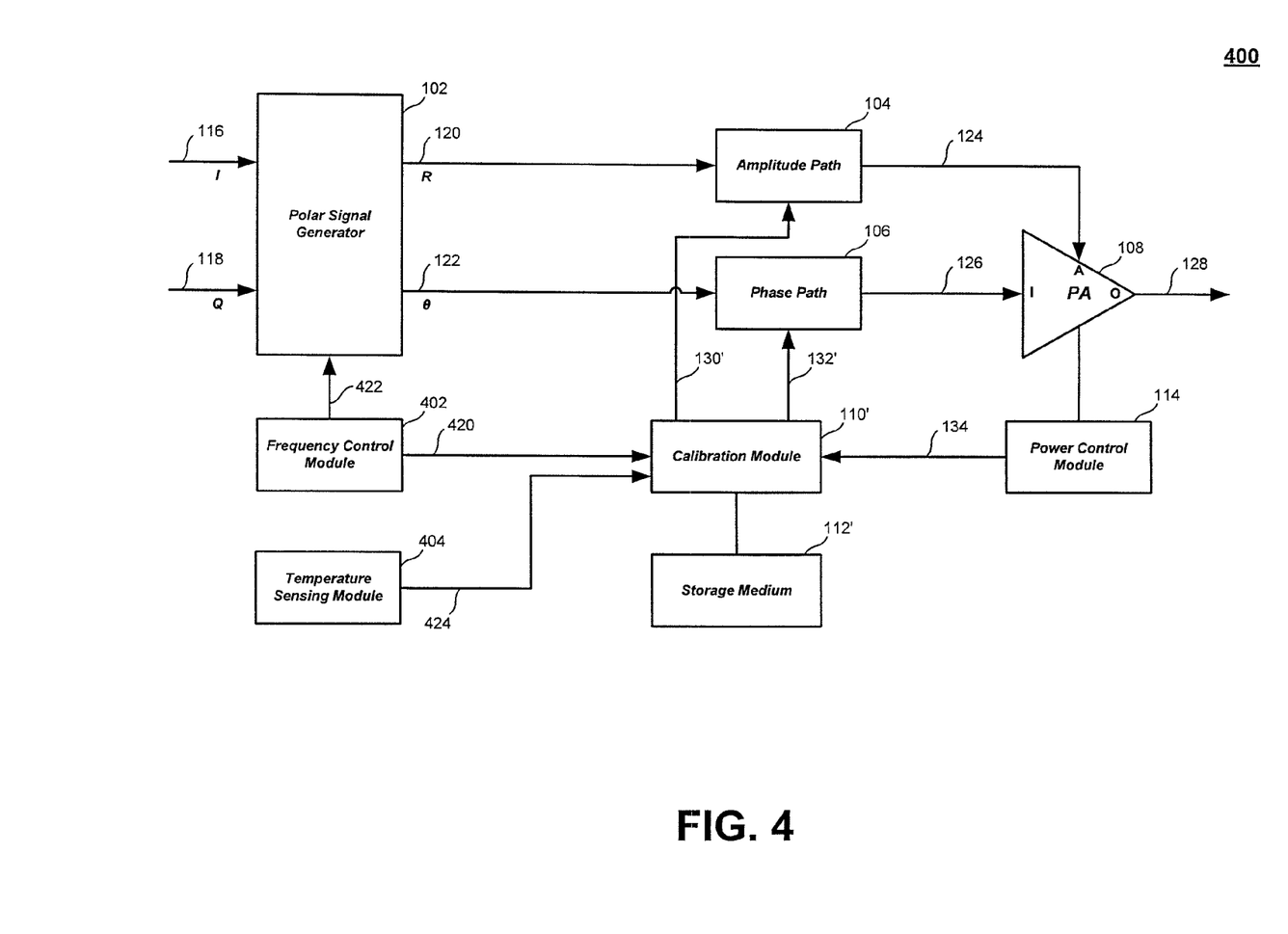
Figure 5:
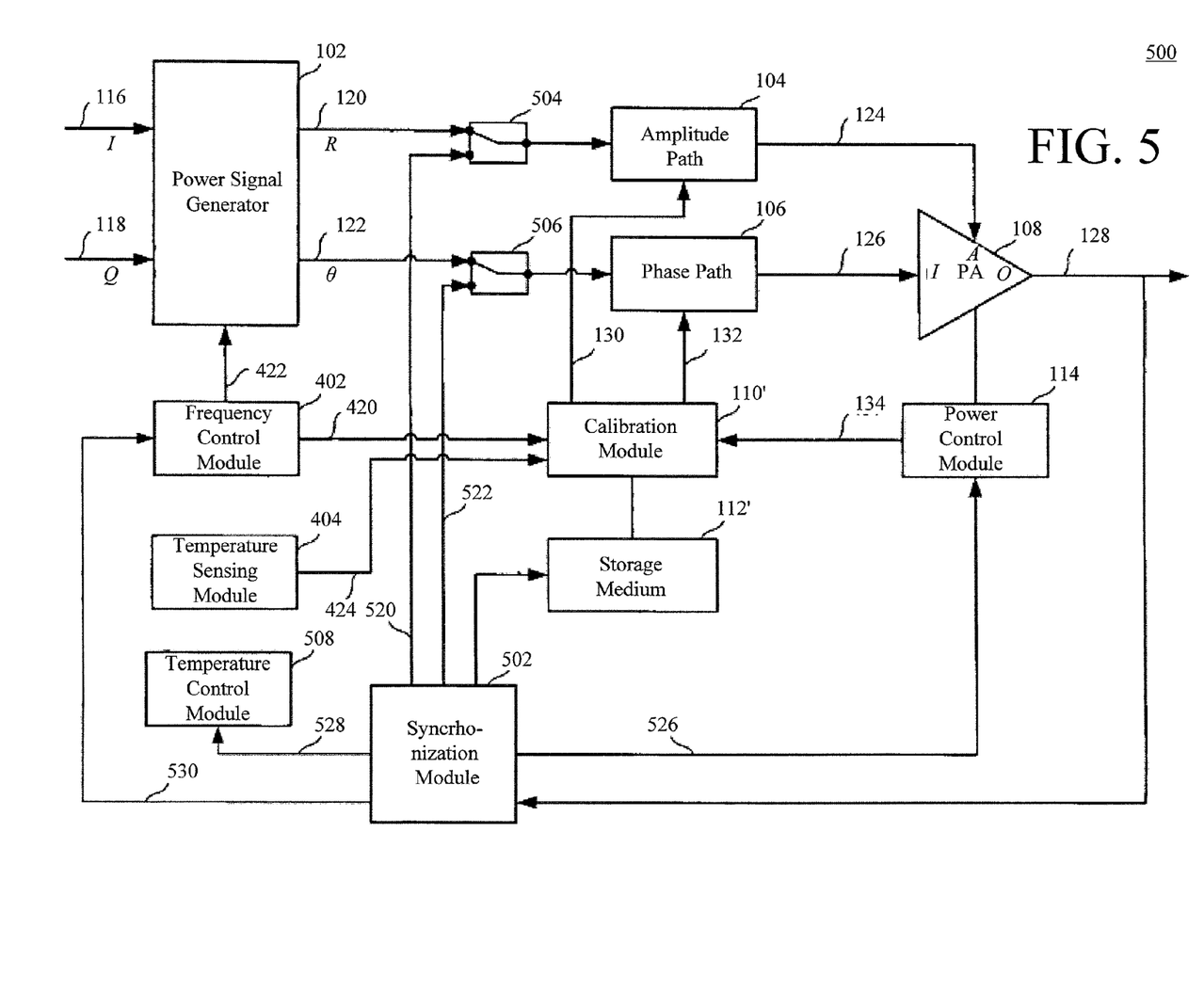

FIGS. 4 and 5 provide examples in which alignment operations may be based on multiple operational parameters. Thus, in these examples, alignment of phase and amplitude paths may be based on the combination of these multiple parameters.

In particular, FIG. 4 is a diagram showing an apparatus 400 that may employ polar modulation techniques. Apparatus 400 is similar to apparatus 100 of FIG. 1. However, apparatus 400 further includes a frequency control module 402 and a temperature sensing module 404. Also, apparatus 400 replaces calibration module 110 with calibration module 110', and replaces storage medium 112 with storage medium 112'. These elements may be implemented in hardware, software, firmware, or any combination thereof.

Frequency control module 402 determines the frequency of polar modulated signal produced by PA 108. As shown in FIG. 4, this control is implemented through a frequency control directive 422, which is sent to polar signal generator 102. In addition, frequency control module 402 sends a current frequency indicator 420 to calibration 110'. This indicator identifies the currently employed frequency of signals output from PA 108.

Temperature sensing module 404 determines a current operational temperature and provides a temperature indicator 424 to calibration module 110'. Temperature sensing module 404 may be implemented in various ways. For instance, temperature sensing module 404 may include a thermistor. However, other implementations may be employed.

Calibration module 110' may reduce polar modulation misalignments (e.g., timing misalignments between amplitude path 104 and phase path 106). This may involve adjusting the delays of one or both paths. In either case, such adjustment(s) offset a difference between the delays of amplitude path 104 and phase path 106 such that these paths have equal (or substantially similar) delays. As described above, such timing misalignments may vary with operating conditions. Therefore, calibration module 110 may provide delay adjustments that also vary with such conditions.

For example, FIG. 4 shows that calibration module 110' may send an amplitude path delay adjustment parameter 130' to amplitude path 104 and/or a phase path delay adjustment parameter 132' to phase path 106. These adjustment parameter(s) may operate upon amplitude path 104 and/or phase path 106 in the manner described above with reference to FIG. 1.

Storage medium 112' may store multiple adjustment settings, where each adjustment setting corresponds to an operating condition. Each operating condition may include an output power level, a temperature, and a signal frequency. Each adjustment setting may include delay adjustment parameters, such as a phase path delay adjustment parameter and/or an amplitude path delay adjustment parameter. This information may be arranged in various ways, such as in a lookup table (LUT) indexed by these operational parameters (output power level, temperature, and output signal frequency). The embodiments, however, are not limited to this arrangement.

Storage medium 112' may be implemented in various ways. For instance, storage medium 112' may comprise memory, such as random access memory (RAM), flash memory, and/or read only memory (ROM). The embodiments, however, are not limited to these examples.

FIG. 5 is a diagram of an apparatus 500, which is similar to the apparatus of FIG. 4. However, apparatus 500 further includes a synchronization module 502, as well as switches

504 and 506. Also, apparatus 500 further includes a temperature control module 508. These elements may be implemented in hardware, software, firmware, or any combination thereof.

Switches 504 and 506 may selectively connect amplitude path 104 and phase path 106 with synchronization module 502. Through these connections, synchronization module 502 may determine path delays and establish corresponding adjustment parameters.

Temperature control module 508 may establish a temperature of apparatus 500. For instance, temperature control module may include heating elements (e.g., one or more resistors) and/or a thermostat that establish a temperature specified by a temperature directive 528.

For instance, synchronization module 502 may generate training signals 520 and 522, which are sent to amplitude path 104 and phase path 106. The resultant output signals (128) are sent to synchronization module 502. Based on these output signals, synchronization module 502 may estimate the delays of paths 104 and 106.

As shown in FIG. 5, synchronization module 502 is coupled to power control module 114, frequency control module 402, and temperature control module 508. Accordingly, synchronization module 502 may direct these elements to apply different parameters (e.g., output power level, output signal frequency, and/or operational temperature).

For instance, FIG. 5 shows synchronization module 502 sending a power level directive 526 that instructs power control module 114 to apply a particular power level. Also, synchronization module 502 may send temperature directive 528 that instructs temperature control module 508 to establish a particular operating temperature. Further, FIG. 5 shows synchronization module 502 sending a frequency directive 530 to frequency control module 402 to establish a certain frequency for output signal 128.

Thus, synchronization module 502 may estimate path delays for operating conditions comprising combinations of output power levels, temperatures, and output signal frequencies. From these estimated, delays, synchronization module 502 may determine corresponding adjustment settings for each operating condition. As described above, such adjustment settings may offset differences in amplitude path delays and phase path delays. Each adjustment setting may include an amplitude path delay adjustment parameter and/or phase path delay adjustment parameter. Synchronization module 502 may store the determined adjustment settings and corresponding operating conditions in storage medium 112'.

Synchronization module 502 may employ various techniques to estimate the delays of amplitude path 104 and phase path 106. For instance, synchronization module 502 may employ the aforementioned techniques described above with reference to FIG. 3 and the techniques disclosed in U.S. patent application Ser. No. 11/396,122, filed on Mar. 30, 2006.

Figure 6:
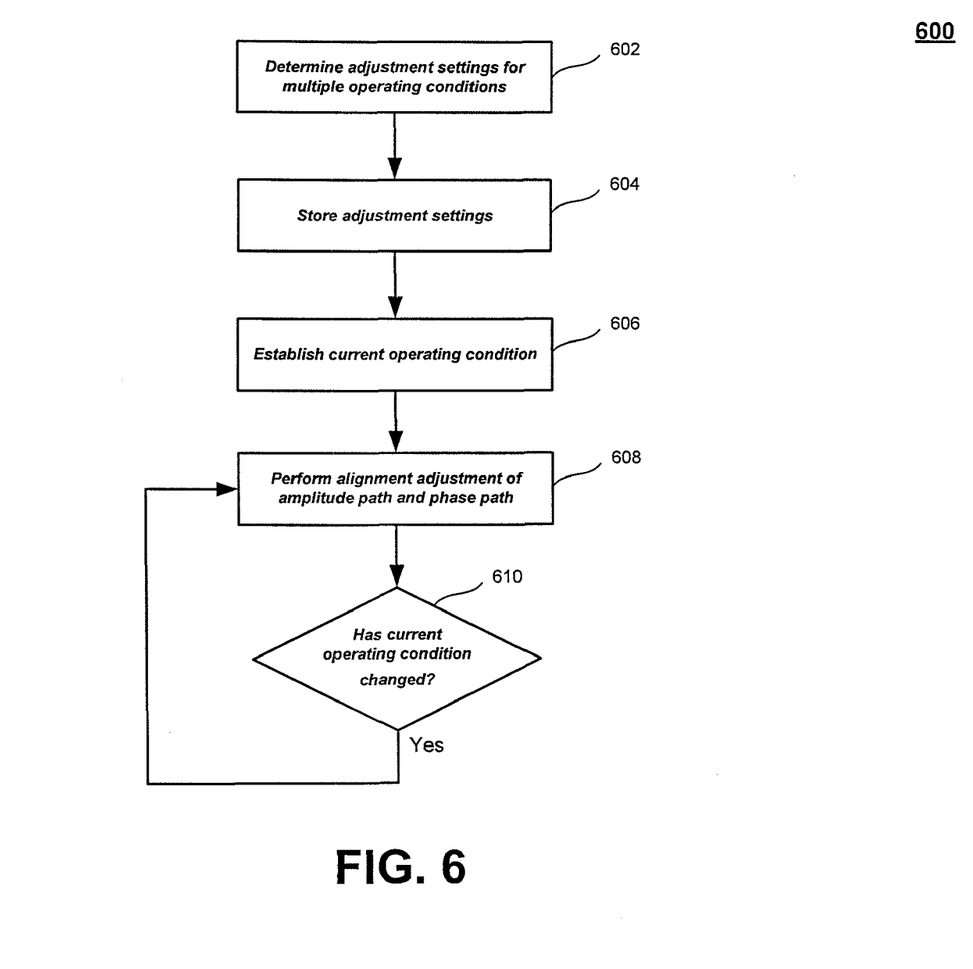
FIGS. 6 and 7 are flow diagrams.

FIG. 6 is a flow diagram 600 of an exemplary operation. This operation is described in the context of a polar modulation arrangement having a phase path, an amplitude path, and a power amplifier. Examples of such arrangements are described above with reference to FIGS. 1-5.

This operation includes a block 602, in which adjustment settings (e.g., an amplitude path delay parameter and/or a phase path delay parameter) are determined for multiple operating conditions. As described above, these operating conditions may include one or more operational parameter values.

At a block 604, these adjustment settings are stored in a storage medium, such as storage medium 112. The operations of blocks 602 and 604 are also referred to herein as a synchronization procedure. An exemplary synchronization procedure is described below with reference to FIG. 7.

This procedure may be performed at various times. For instance, blocks 602 and 604 may be performed during product manufacturing, assembly, and/or testing. Alternatively or additionally, blocks 602 and 604 may performed during device operation. For example, with reference to FIG. 3, these blocks may be performed during device operation by synchronization module 302. Performance of these blocks may occur upon the occurrence of one or more events. Such events may include the application of operational power and/or the initiation of a call or data communication, and/or the occurrence of other events.

At a block 606, a current operating condition is established. In the context of FIG. 1, this may be established by power control module 114. In the context of FIG. 3, this may be established by power control module 114, frequency control module 402, and temperature sensing module 404. The embodiments, however, are not limited to these contexts.

Also, at a block 608, an alignment adjustment of the amplitude path and phase path is performed. This may involve accessing a corresponding stored adjustment setting (e.g., an amplitude path delay adjustment parameter and/or a phase path adjustment parameter), and applying the setting to the amplitude path and/or to the phase path at a block 608. Referring again to FIGS. 1, 3, 4, and 5, this may involve sending delay adjustment parameter 130 (or 130') to amplitude path 104 and/or sending delay adjustment parameter 132 (or 132') to phase path 106. The embodiments, however, are not limited to these contexts.

At a block 610, it is determined whether the operating condition has changed. If so, then operation returns to block 608. As described above, this block performs an alignment adjustment of the amplitude path and/or the phase path.

Figure 7:
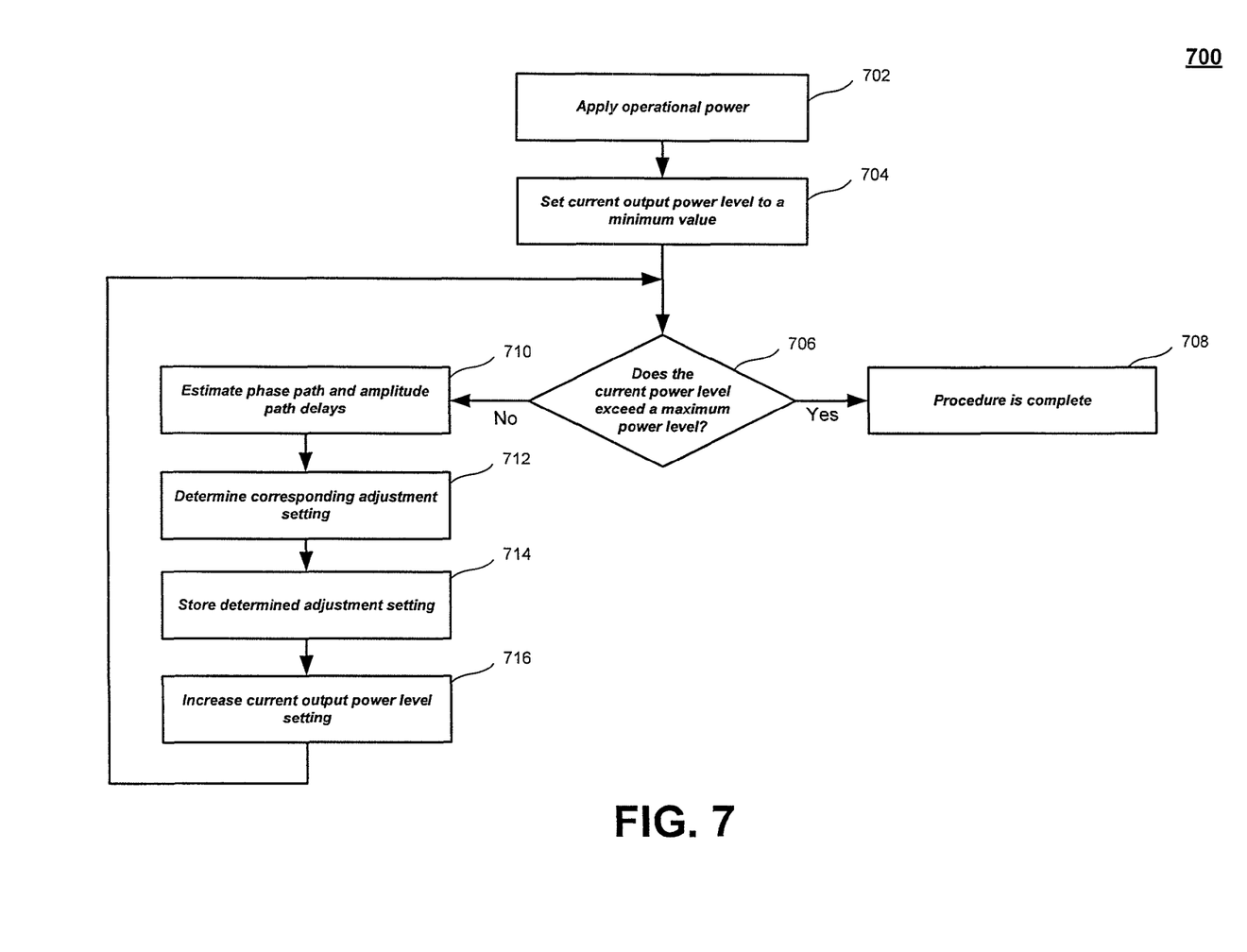

As described above, synchronization procedures may be performed that establish alignment adjustment settings for multiple operating conditions. FIG. 7 is a flow diagram 700 of an exemplary synchronization procedure. This procedure may be performed in a variety of contexts, such as those described above with reference to FIGS. 1-5. The embodiments, however, are not limited to these contexts.

The flow diagram of FIG. 7 involves synchronization based on various output power levels. However, this diagram is shown for purposes of illustration and not limitation. Thus, as described herein, the embodiments may establish adjustment settings for operating conditions involving a variety of parameters. Examples of such parameters may include any combination of output power level, transmit frequency, temperature, and so forth.

As shown in FIG. 7, this procedure includes a block 702, in which operational power is applied. This allows for various output power level settings to be applied to a power amplifier, such as PA 108.

At a block 704, a current output power level for the power amplifier is set to a minimum value. At block 706, it is determined whether the current output power level exceeds a maximum power level. If so, then (as indicated by a block 708) the synchronization procedure is complete. Otherwise, operation proceeds to a block 710.

At block 710, amplitude path delays and phase path delays are measured or estimated for the current power level. As described above, these measurements or estimates may be performed in accordance with a variety of techniques.

Based on these measurements, a corresponding adjustment setting is determined at a block 712. As described above, this setting may include an amplitude path delay adjustment parameter and/or a phase path delay adjustment parameter.

Determination of this setting may involve determining a difference between the two path delays. From this difference, a delay adjustment parameter may be established for one of the paths (e.g., the faster path) that provides for equal path delays. Alternatively, two delay adjustment parameters (i.e., one for each path) may be established. These delay adjustments also provide for equal path delays.

The determined adjustment setting is stored at a block 714. This stored setting may be indexed according to the current power level to provide for power-based calibration during device operation. In the context of FIGS. 1, 3, 4, and 5, the adjustment setting is stored in storage medium 112 (or 112').

At a block 716, the current output power level setting is increased and operation returns to block 706. This increase may be by a predetermined step size. For example, the step size may correspond to a power level step size employed by a communications network (e.g., a WCDMA network). The embodiments, however, are not limited to this example.

Thus, the operation of FIG. 7 provides adjustment settings across a range of output power levels. These output power levels may include power levels corresponding to each of a communications network's power control steps. In further embodiments, a synchronization procedure similar to the one shown in FIG. 7 may step through multiple operating conditions that each include multiple operational parameter values, and determine adjustment settings for each condition. These adjustment settings may then be stored for use during operations. As described above, such operational parameters may include any combination of output power level (e.g., according to power control steps), signal frequency, temperature, and so forth. However, the embodiments are not limited to these parameters.

Calibration of amplitude and phase paths may occur with changes in output power levels. Such power level changes may occur for various reasons, such as the beginning and ending of particular transmissions, power level adjustments as a result of network power control algorithms, changes in data rates, and so forth. Examples of such power level changes are described below with reference to FIGS. 8-10.

Figure 8:
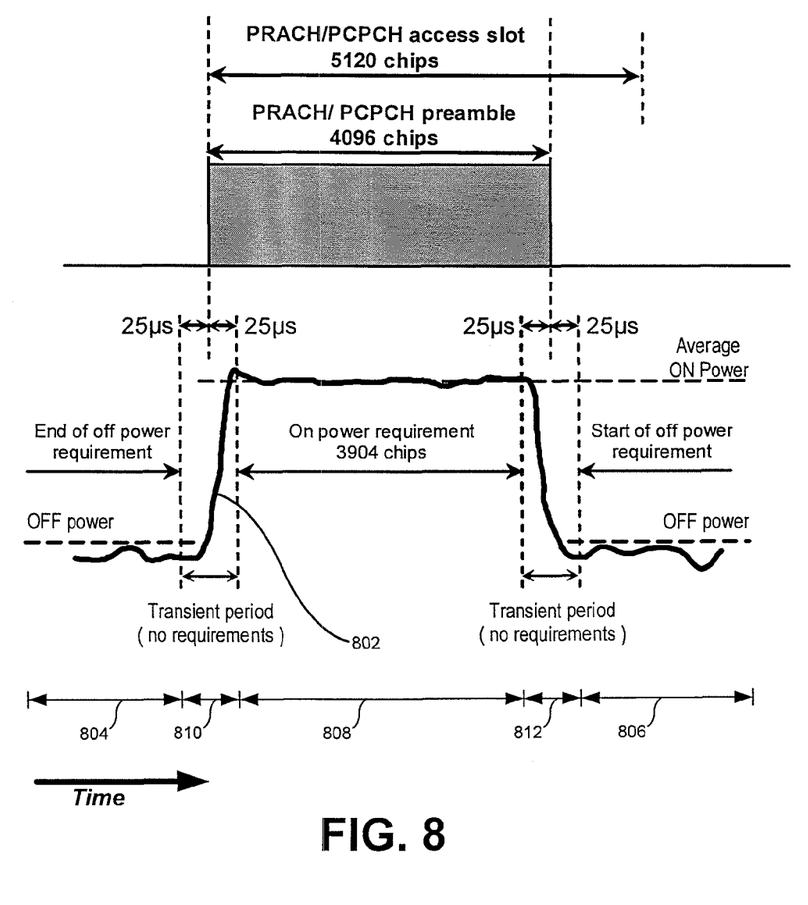
FIGS. 8-10 provide examples of output power characteristics.
Figure 9:
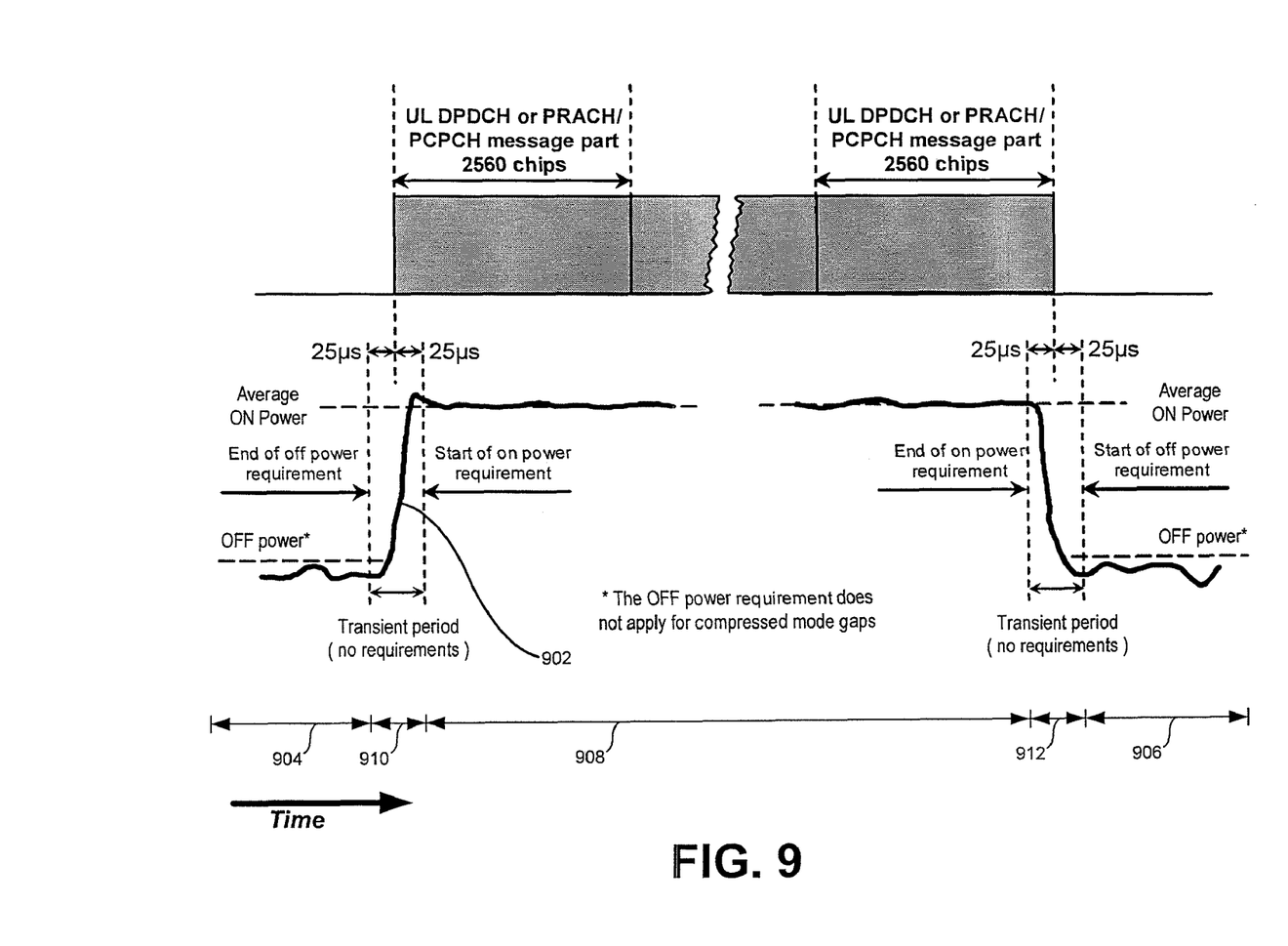
Figure 10:
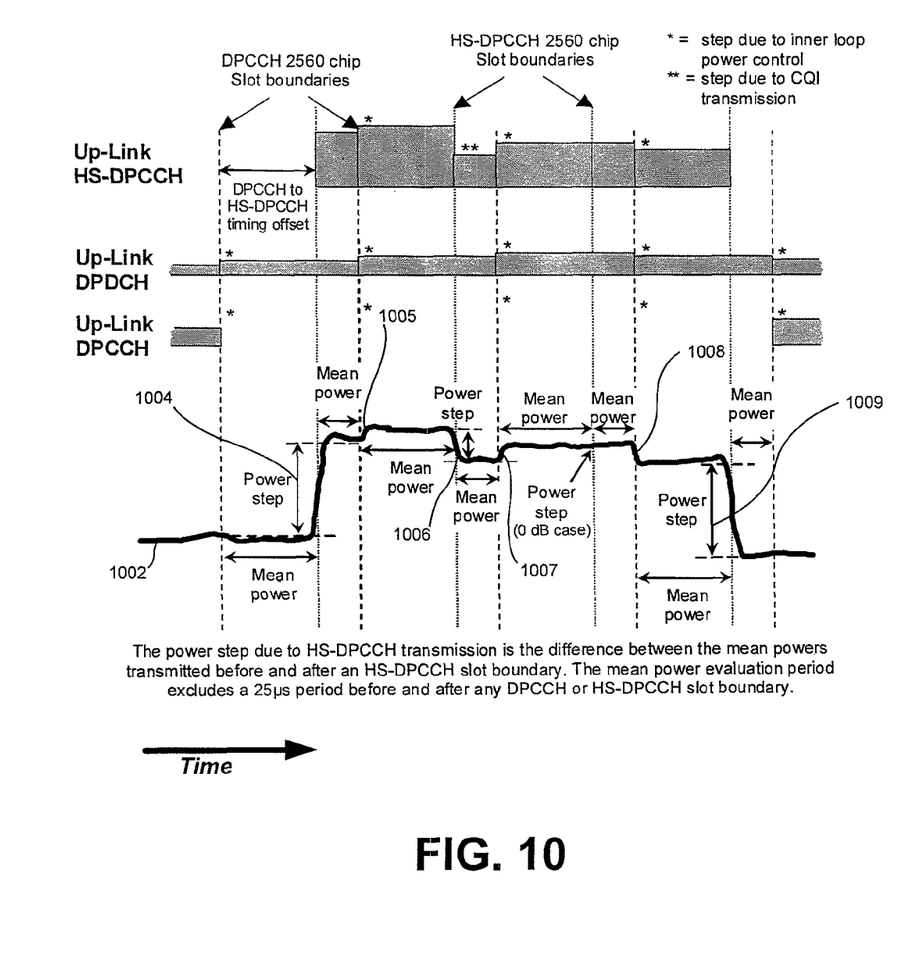

For purposes of illustration (and not limitation) the examples of FIGS. 8-10 are provided in the context of a wideband code division multiple access (WCDMA) communications network. WCDMA networks employ 10 millisecond transmission frames. A WCDMA transmission frame includes 15 timeslots of 0.667 milliseconds each. A user device may receive power control commands at every slot (thus, providing a power control rate of 1.5 kHz).

User device transmissions are referred to as uplink (UL) transmissions. Various physical UL channels may be arranged into WCDMA frames. For instance, each user device is allocated two dedicated uplink physical channels: a dedicated physical data channel (DPDCH), and a dedicated physical control channel (DPCCH). A high speed DPCCH (HS-DPCCH) may also be employed. In addition, user devices may send uplink transmissions across physical random access channels (PRACHs) and physical common packet channels (PCPCHs).

FIG. 8 is a diagram showing power characteristics associated with the transmission of a WCDMA preamble. This transmission may be a PRACH preamble during a PRACH access slot or a PCPCH preamble during a PCPCH access slot.

In particular, FIG. 8 includes a power curve 802 showing a user device's output power level as a function of time. Curve 802 shows that user device power levels are associated with various time intervals. For instance, during time intervals 804 and 806, the user device is in an OFF state. In contrast, the user device is in an ON state during a time interval 808. The beginning and end of WCDMA time slots may include guard intervals (e.g., 25 microsecond guard intervals). Thus, FIG. 8 further shows a 50 microsecond power transient time interval 810 between intervals 804 and 808, and a 50 microsecond power transient time interval 812 between intervals 808 and 806.

In embodiments, calibration (adjustment of amplitude and phase path alignment based on one or more operational parameters (such as a power)) may be performed during such transient time intervals. For instance, during time interval 810, the user device may adjust the alignment of its amplitude and phase paths based on the ON state power level of time interval 808. Similarly, during time interval 812, the user device may adjust the alignment of its amplitude and phase paths based on the OFF state power level of time interval 806.

Also, as a wide range of power levels occurs in time intervals 810 and 812, synchronization procedures may be performed during such intervals. More particularly, adjustment settings for one or more output power levels (as well as any other parameter(s)) may be determined and stored (e.g., in storage medium 112 or 112'). In such cases, synchronization may precede actual adjustment of amplitude and phase path alignment that may occur at the completion of such time intervals. Synchronization procedures during these time intervals are provided as examples, and not as limitations. Therefore, synchronization procedures may be performed at other times.

FIG. 9 is a diagram providing a further example of a user device's power characteristics. These power characteristics are associated with the transmission of a WCDMA message part, such as a PRACH message part or an uplink (UL) DPDCH message.

For instance, FIG. 9 includes a power curve 902 showing a user device's output power level as a function of time. Similar to FIG. 8, the user device is in an OFF state during time intervals 904 and 906. However, during a time interval 908, the user device is in an ON state. Also, FIG. 9 further shows a 50 microsecond power transient time interval 910 between intervals 904 and 908, and a 50 microsecond power transient time interval 912 between intervals 908 and 906.

The user device may calibrate (adjust the alignment of its amplitude and phase paths) during the transient time intervals of FIG. 9. For example, during time interval 910, the user device may adjust the alignment of its amplitude and phase paths based on the ON state power level of time interval 908. Similarly, during time interval 912, the user device may adjust the alignment of its amplitude and phase paths for the OFF state power level of time interval 906.

Also, as a wide range of power levels occurs in time intervals 910 and 912, synchronization procedures may be performed during such intervals. More particularly, adjustment settings for one or more output power levels (as well as any other operating parameter(s)) may be determined and stored (e.g., in storage medium 112). In such cases, synchronization may precede actual adjustment of amplitude and phase path alignment that may occur at the completion of such time intervals. Synchronization procedures during these time intervals are provided as examples, and not as limitations. Therefore, synchronization procedures may be performed at other times. Also, synchronization procedures are not limited to being based on power.

FIG. 10 is a diagram providing yet a further example of a user device's power characteristics. In particular, FIG. 10 includes a curve 1002 that illustrates the user device's output power level as a function of time.

Curve 1002 includes multiple power level transitions 1004-1009. These transitions occur for various reasons. For instance, transition 1004 corresponds to the beginning of an uplink transmission (shown as Up-Link HS-DPCCH). In contrast, transitions 1005, 1007 and 1008 occur from inner loop power control steps. Transition 1006 is due to a channel quality indicator (CQI) transmission. Finally, transition 1009 results from completion of the up-link HS-DPCCH transmission. In embodiments, adjustment of amplitude and phase path alignment may occur at one or more of these transitions.

Also, as a wide range of power levels occurs in transitions 1004 and 1009, synchronization procedures may be performed during such intervals. More particularly, adjustment settings for one or more output power levels (as well as any other parameter values) may be determined and stored (e.g., in storage medium 112). In such cases, synchronization may precede actual adjustment of amplitude and phase path alignment that may occur upon completion of such transitions. Synchronization procedures during these transitions are provided as examples, and not as limitations. Therefore, synchronization procedures may be performed at other times, such as one or more of the other transitions depicted in FIG. 10. Moreover, synchronization procedures may be performed at fractional slot boundaries as well. For instance, synchronization at these times may be beneficial if substantial variations over process, voltage, and temperature occur.

While various embodiments of the present invention have been described above, it should be understood that they have been presented by way of example only, and not in limitation. For instance, embodiments are not limited to employments in WCDMA networks.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

The invention claimed is:

1. An apparatus, comprising:
 a storage medium to store a plurality of adjustment settings, each adjustment setting corresponding to an operating condition of said apparatus and provided for reducing a polar modulation timing misalignment occurring within said apparatus; and
 an electronic calibration circuit coupled to said storage medium and configured to
  receive values for a plurality of different operational parameters which describe a current operating condition of said apparatus, said plurality of different operational parameters comprising an output power level parameter, an output signal frequency parameter and a temperature parameter,
  select an adjustment setting from the plurality of adjustment settings which corresponds to a particular combination of values for said plurality of different operational parameters, and
  reduce said polar modulation timing misalignment with the adjustment setting which was previously selected.

2. The apparatus of claim 1, wherein the adjustment setting includes a phase path delay adjustment parameter and/or an amplitude path delay adjustment parameter.

3. The apparatus of claim 1, further comprising:
 a phase path;
 an amplitude path; and
 an amplifier to receive a first signal from the phase path and a second signal from the amplitude path; and
 wherein the polar modulation timing misalignment corresponds to a difference in a delay of the phase path and a delay of the amplitude path.

4. The apparatus of claim 3,
 wherein the adjustment setting includes a phase path delay adjustment parameter; and
 wherein the phase path includes a variable delay element to adjust the delay of the phase path based on the phase path delay adjustment parameter.

5. The apparatus of claim 3,
 wherein the adjustment setting includes an amplitude path delay adjustment parameter; and
 wherein the amplitude path includes a variable delay element to adjust the delay of the phase path based on the amplitude path delay adjustment parameter.

6. The apparatus of claim 3, further comprising a power control circuit to provide the amplifier with a current output power level setting, and to indicate the current output power level setting to the electronic calibration circuit.

7. The apparatus of claim 1, further comprising a synchronization circuit to determine the plurality of adjustment settings.

8. The apparatus of claim 7, wherein the synchronization circuit determines the plurality of adjustment settings based on output signals generated from training signals.

9. An apparatus, comprising:
 a phase path to provide a phase signal;
 an amplitude path to provide an amplitude signal;
 an amplifier to produce a polar modulated signal from the phase signal and the amplitude signal;
 a storage medium to store a plurality of adjustment settings, each adjustment setting corresponding to an operating condition of said apparatus and provided for reducing a polar modulation timing misalignment between the phase path and the amplitude path; and
 a calibration circuit coupled to the storage medium and configured to
  receive values for a plurality of different operational parameters which describe a current operating condition of said apparatus, said plurality of different operational parameters comprising an output power level parameter, an output signal frequency parameter and a temperature parameter,
  select an adjustment setting from the plurality of adjustment settings which corresponds to a particular combination of values for said plurality of different operational parameters, and
  reduce the polar modulation timing misalignment between the phase path and the amplitude path with the adjustment setting which was previously selected.

10. The apparatus of claim 9, wherein the adjustment setting includes a phase path delay adjustment parameter and/or an amplitude path delay adjustment parameter.

11. The apparatus of claim 9, wherein a current output power level setting of said apparatus is based on a power control command received from a remote device.

12. The apparatus of claim 11, further comprising a power control circuit to provide the amplifier with the current output power level setting, and to indicate the current output power level setting to the calibration circuit.

13. A method, comprising:
 storing in a storage medium a plurality of adjustment settings, each adjustment setting corresponding to an operating condition of an apparatus and provided for reducing a polar modulation timing misalignment occurring within said apparatus;

receiving, by an electronic circuit, values for a plurality of different operational parameters which describe a current operating condition of said apparatus, said plurality of different operational parameters comprising an output power level parameter, an output signal frequency parameter and a temperature parameter;

selecting, by the electronic circuit, an adjustment setting from the plurality of adjustment settings which corresponds to a particular combination of values for the plurality of different operational parameters; and reducing, by the electronic circuit, said polar modulation timing misalignment with the adjustment setting which was previously selected.

14. The method of claim 13, wherein the adjustment setting includes a phase path delay adjustment parameter and/or an amplitude path delay adjustment parameter.

15. The method of claim 13, wherein the polar modulation timing misalignment is reduced by adjusting a delay of an amplitude path.

16. The method of claim 13, wherein the polar modulation timing misalignment is reduced by adjusting a delay of a phase path.

17. The method of claim 13, further comprising determining the plurality of adjustment settings based on output signals generated from training signals.

* * * * *